United States Patent
Dogan et al.

(10) Patent No.: US 6,733,068 B2
(45) Date of Patent: May 11, 2004

(54) DEVICE FOR INCREASING STRENGTH OF A HOLLOW SHAPED PART OF A VEHICLE BODY

(75) Inventors: Hamdi Dogan, Osnabrueck (DE); Rainer Wess, Osnabrueck (DE); Markus Exner, Belm (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 10/158,736

(22) Filed: May 30, 2002

(65) Prior Publication Data

US 2002/0180245 A1 Dec. 5, 2002

(30) Foreign Application Priority Data

May 30, 2001 (DE) .......................... 101 26 183

(51) Int. Cl.⁷ ............................... B62D 27/00
(52) U.S. Cl. .................. 296/205; 296/30; 296/193.06
(58) Field of Search ............. 296/205, 203.02, 296/203.03, 29, 30, 187.01, 187.03, 187.08, 187.12, 193.06, 203.01; 52/731.6, 735.1

(56) References Cited

U.S. PATENT DOCUMENTS

| | | | | |
|---|---|---|---|---|
| 2,965,414 A | * | 12/1960 | Engelhard | |
| 4,563,035 A | * | 1/1986 | Hirakami et al. | 296/188 |
| 4,682,812 A | * | 7/1987 | Hurten et al. | 296/188 |
| 4,826,238 A | * | 5/1989 | Misono et al. | 296/205 |
| 5,810,428 A | * | 9/1998 | Maki | 296/205 |
| 6,302,478 B1 | * | 10/2001 | Jaekel et al. | 296/205 |
| 6,402,414 B1 | * | 6/2002 | Kanodia et al. | 296/205 |
| 6,412,857 B2 | * | 7/2002 | Jaekel et al. | 296/205 |
| 2003/0184109 A1 | * | 10/2003 | Hellgren et al. | 296/30 |

FOREIGN PATENT DOCUMENTS

| | | | | |
|---|---|---|---|---|
| DE | 195 18 946 A1 | 11/1995 | | |
| DE | 197 10 894 | 9/1998 | | |
| JP | 361016175 A | * | 1/1986 | 296/203.01 |
| JP | 402200580 A | * | 8/1990 | 296/29 |
| JP | 404046875 A | * | 2/1992 | 296/29 |

* cited by examiner

Primary Examiner—D. Glenn Dayoan
Assistant Examiner—H. Gutman
(74) Attorney, Agent, or Firm—Michael J. Striker

(57) ABSTRACT

A device for increasing strength of a hollow shaped part with a closed cross-section for a vehicle body has at least one reinforcing element extendable at least partially into an inner space of the hollow shaped part and connectable with the hollow shaped part, and an aperture provided in the hollow shaped part and formed so that the reinforcing element extends into the inner space of the hollow shaped part.

9 Claims, 5 Drawing Sheets

DEVICE FOR INCREASING STRENGTH OF A HOLLOW SHAPED PART OF A VEHICLE BODY

BACKGROUND OF THE INVENTION

The present invention relates to a device for increasing the strength of a hollow shaped part of a vehicle body, which has a closed cross-section.

German patent document DE 195 18 946 A1 discloses a vehicle structural component or a hollow shaped part with a closed cross-section, which is formed of at least two interconnected components. The vehicle structural component is a front support or a A-support of a vehicle body, composed of an outer plate, a support reinforcement and an inner support of light metal. For stiffening of the vehicle structural component, a reinforcing element produced of light metal extrusion is provided. It has an outer shape which is substantially identical to an inner shape of the closed cross-section of the vehicle structural component. The reinforcing element is arranged inside the region of the closed cross-section of the vehicle structural component.

For further increase of the strength of the vehicle structural component, several iron elements, such as for example a steel pipe or a steel plate or similar elements, are arranged along the hollow region of the reinforcing element.

The disadvantage of this solution is however that the vehicle structural component is composed of several individual parts which must be held before the manufacture and connected with one another in various manufacturing steps. This leads to a complicated and cost-intensive manufacturing process.

Moreover, another disadvantage of this solution is that the known vehicle structural component, due to the complicated multi-part construction, has a high total weight. This is disadvantageous for the automobiles since it is contrary to the tendencies in automobiles for reducing the fuel consumption by reducing the vehicle weight.

In addition, the known vehicle structural component has the disadvantage that the reinforcing element provided in the inner space of the vehicle structural element has low manufacturing tolerances, to ensure an easy adaptation of the reinforcing element in the interior space of the vehicle structural element.

SUMMARY OF THE INVENTION

Accordingly, it is an object of the present invention to provide a device for increasing the strength of a hollow shaped part of a vehicle body, having a closed cross-section, which eliminates the disadvantages of the prior art.

More particularly, it is an object of the present invention to provide a device for increasing the strength of a hollow shaped part with a closed cross-section for a vehicle body, which makes possible the manufacture of a vehicle body with a high strength and a low total weight, and with low manufacturing costs.

In keeping with these objects and with others which will become apparent herein after, one feature of the present invention resides, briefly stated, in a device for increasing the strength of a hollow shaped part with a closed cross-section for a vehicle body, in which the reinforcing element extends through an aperture of the hollow shaped part in its inner space.

Since the inventive device has the reinforcing element which is arranged at least partially in an inner space of the hollow shaped part, and also is connected with the hollow shaped part and extends through a recess of the hollow shaped part in its inner space, a simple mounting and manufacture of a correspondingly designed vehicle structural component is provided in an advantageous manner. This leads to reduced manufacturing costs.

Moreover, the inventive device has the advantage that a hollow shaped part of a vehicle body which is provided with the inventive device has a high component strength with a low weight. The reason is that the hollow shaped part after its manufacture is provided with a simple design reinforcing element which is inserted through the aperture into the inner space and is fixedly connected with the hollow shaped part.

A special cost-favorable manufacture of a hollow shaped part of a vehicle body is provided when the hollow shaped part is formed as a one-piece component which is produced by an inner high pressure molding and provided with the reinforcing element. Thereby a hollow shaped part of a vehicle body, such as for example an A-support can be produced with cross-sections which correspond to special construction space requirements and strength requirements in one manufacturing step, and can be provided with a reinforcing element in particularly highly loaded regions in the above described simple manner.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
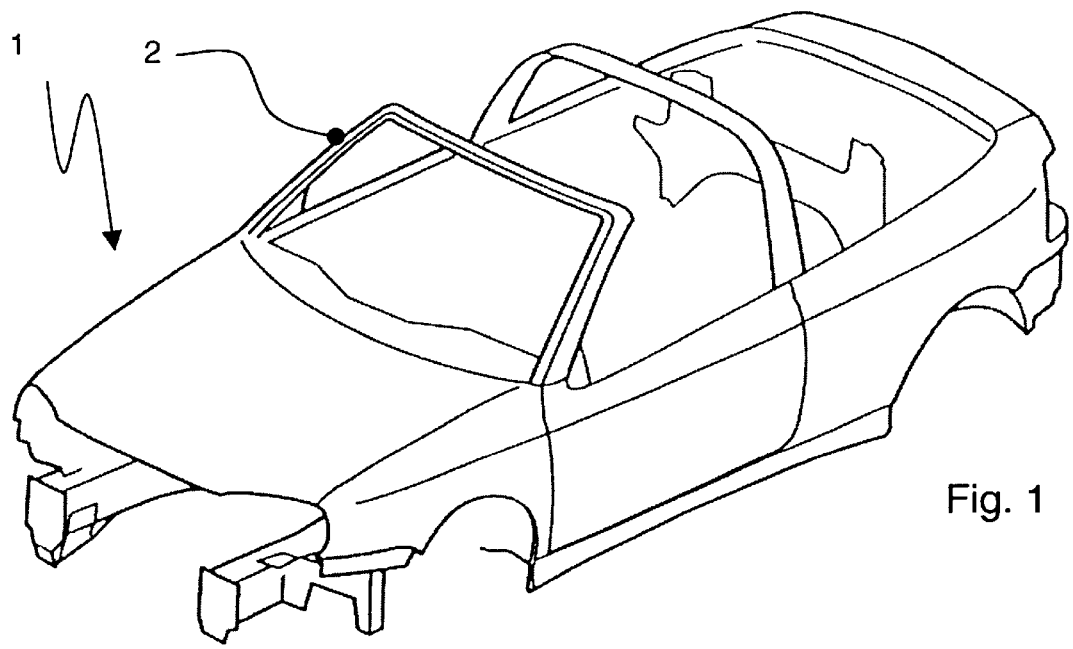
FIG. 1 is a simplified three-dimensional view of a body of a cabriolet or convertible vehicle.
Figure 2:
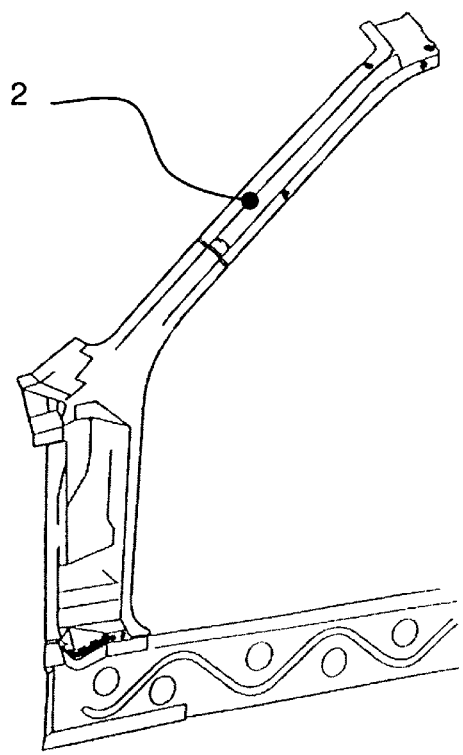
FIG. 2 is a schematic three-dimensional view of a vehicle structural component, taken separately.

FIG. 1 shows a vehicle body 1 of a cabriolet or convertible automobile, with vehicle structural components formed as hollow shaped parts. An example for illustration of the invention is a hollow shaped part 2 which represents a A-support of the vehicle body 1 and is shown in FIG. 2 separately.

Figure 3:
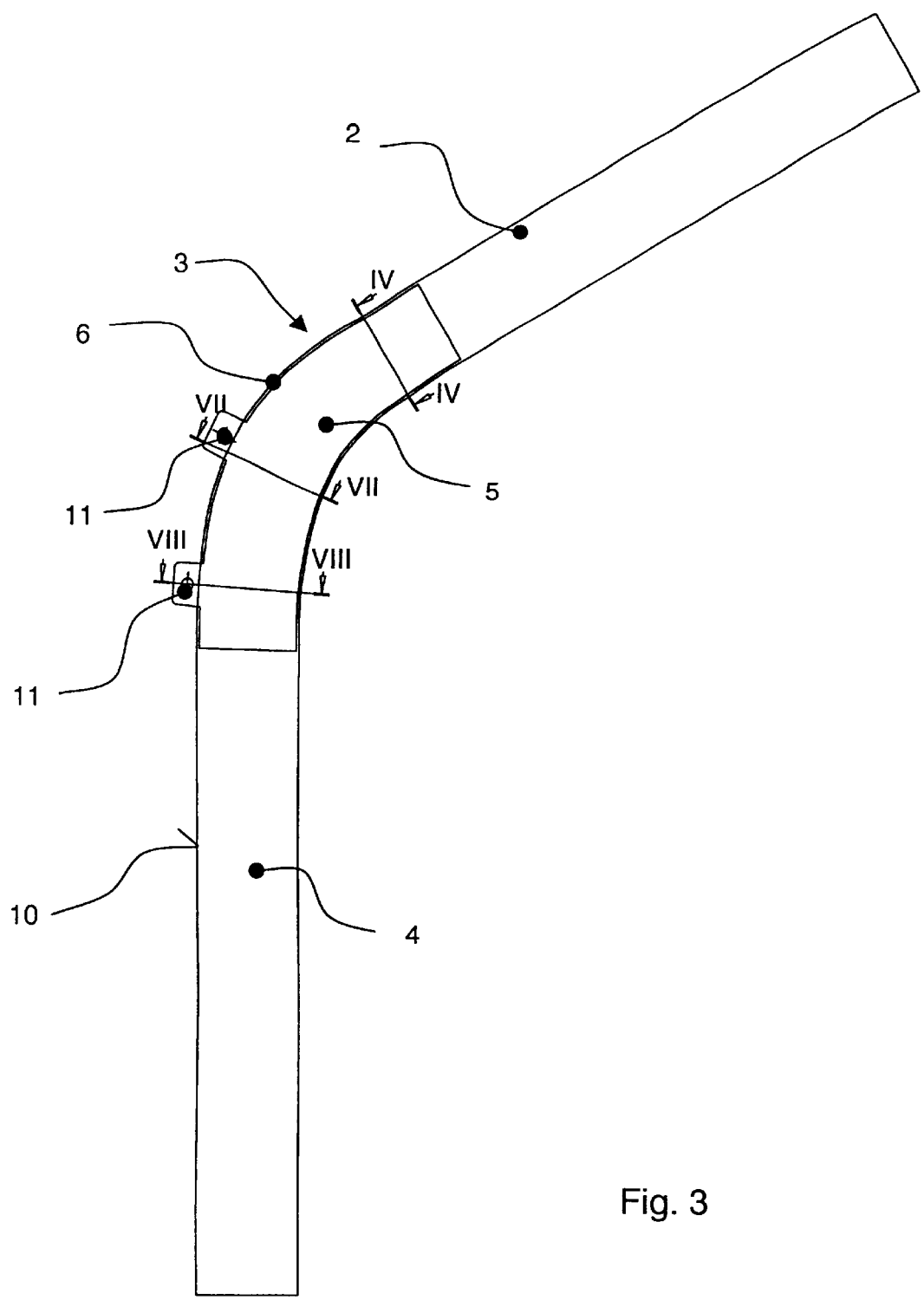
FIG. 3 is a schematic view of the structural component of a vehicle body of FIG. 2.

The vehicle structural component 2 is shown in FIG. 3 schematically in a cross-section. The vehicle structural component or the hollow shaped part 2 is formed with a closed cross-section. It is provided with a device 3 for increasing the strength of the hollow shaped part 2. The device 3 has a reinforcing element 5 that extends in an inner space 4 of the hollow shaped part 2. It is fixedly connected with the hollow shaped part 2.

The reinforcing element 5 is inserted in an aperture 6 or 7 of the hollow shaped part 2 into the inner space 4 of the hollow shaped part 2. It has a thickness, size and shape which corresponds to those of the inner space 4 of the hollow shaped part 2. The reinforcing element 5 at least extends into the inner space 4.

In the subsequent description in FIGS. 4–8 components which are identical functionally are identified with the same reference numerals to simplify the description and the illustration.

Figure 4:
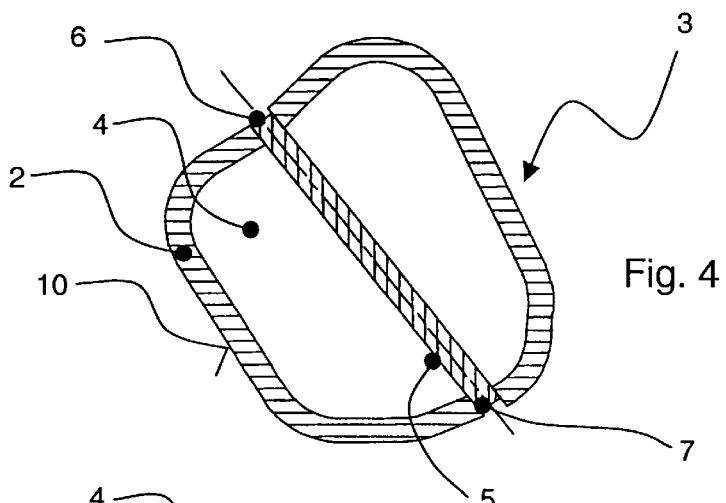
FIG. 4 is a view showing a cross-section of the vehicle structural component, taken along the line IV—IV in FIG. 3.

The hollow shaped part 2 is shown in FIG. 4 in a cross-section which is taken along the line IV—IV in FIG. 3. The reinforcing element 5 has a cross-section of a flat profile. The reinforcing element 5 has an end which faces away of a slot-shaped aperture 6. It is engaged with this end into a second aperture 7 located in the hollow shaped part 2 substantially opposite to the aperture 6, and is held there.

The apertures 6 and 7 are produced by conventional methods. For example, they can be made by sawing or by laser cutting in the vehicle structural component 2.

The reinforcing element 5 therefore forms a central web of the hollow shaped part 2. It is fixedly connected with the hollow shaped part 2 in the regions of the apertures 6 and 7.

Figure 5:
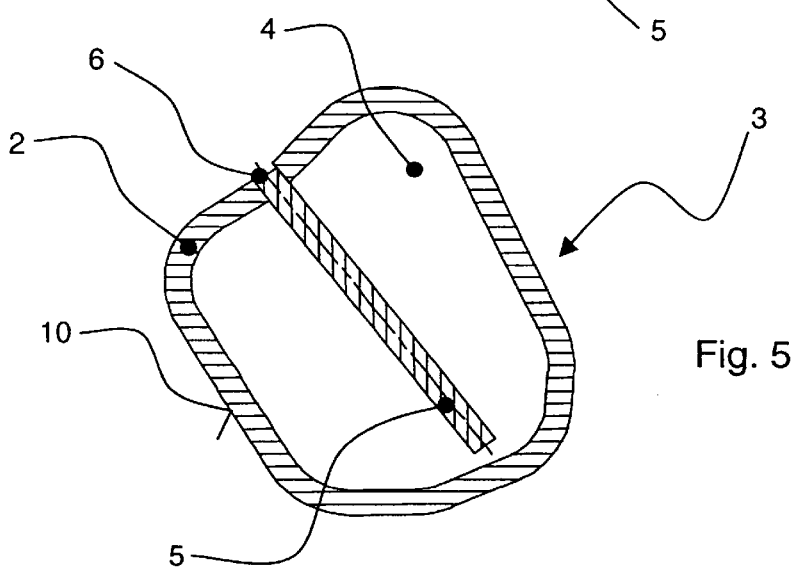
FIG. 5 is a sectional view of the vehicle structural component of FIG. 3 taken along the line IV—IV, and showing an embodiment of the arrangement of the reinforcing element which is different from FIG. 4.

FIG. 5 shows a second embodiment of the device 3. Here the hollow shaped part 2 is however provided with the apertures 6 for insertion of the reinforcing element 5 into the inner space 4 of the vehicle structural component 2. The end of the reinforcing element 5 which is opposite to the aperture 6 is arranged at a distance from the wall of the hollow shaped part 2.

Figure 6:
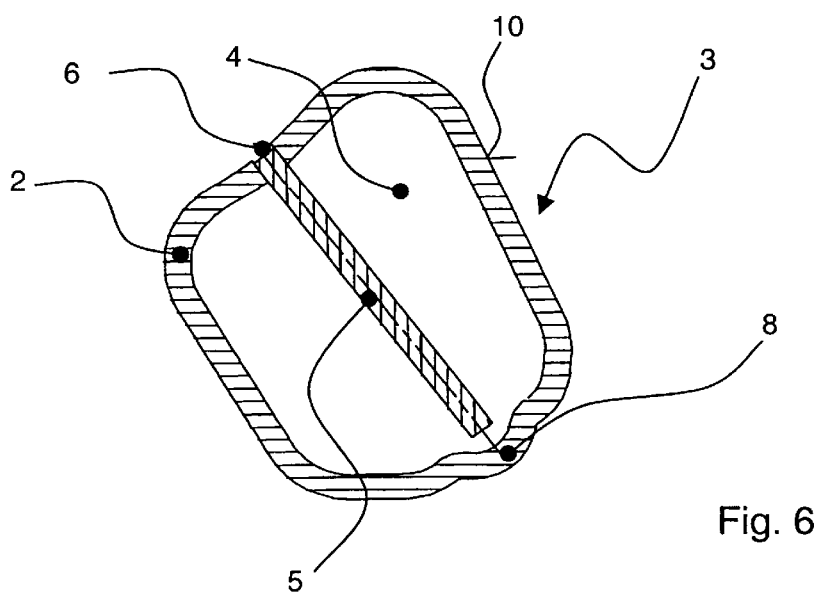
FIG. 6 is a view showing the further cross-sectional view taken along the line IV—IV in FIG. 3, and showing a further embodiment of the hollow shaped part which is different from FIG. 3.

FIG. 6 shows a further embodiment of the device 3, with a section of the hollow shaped part 2 taken along the line IV—IV in FIG. 1. This hollow shaped part 2 is provided with a curved out portion which is located at the side of the reinforcing element 5 that is opposite to the aperture 6 and formed as a centering contour 8. The reinforcing element 5 extends with its end into the curved portion of the centering contour 8 of the hollow shaped part 2. In the event of a deformation of the hollow shaped part 2 which can be caused by a crash, the reinforcing element 5 is received into this curved portion and centered there, so that an uncontrollable deviation or buckling is avoided or at least reduced. Thereby the strength of the hollow shaped part 2 and therefore of the vehicle body 1 has a desirable high level also in the event of a crash.

In accordance with a not shown embodiment of the device 3, it can be provided that the hollow shaped part 2 at the side facing away from the aperture 6 can be formed alternatingly or in any arrangement with the further aperture 7 and with the centering contour 8. The reinforcing element, depending on the corresponding application cases, can be fixedly connected with the hollow shaped part 2 or not connected with it in the region of the aperture 7 which extends locally in corresponding sections.

Figure 7:
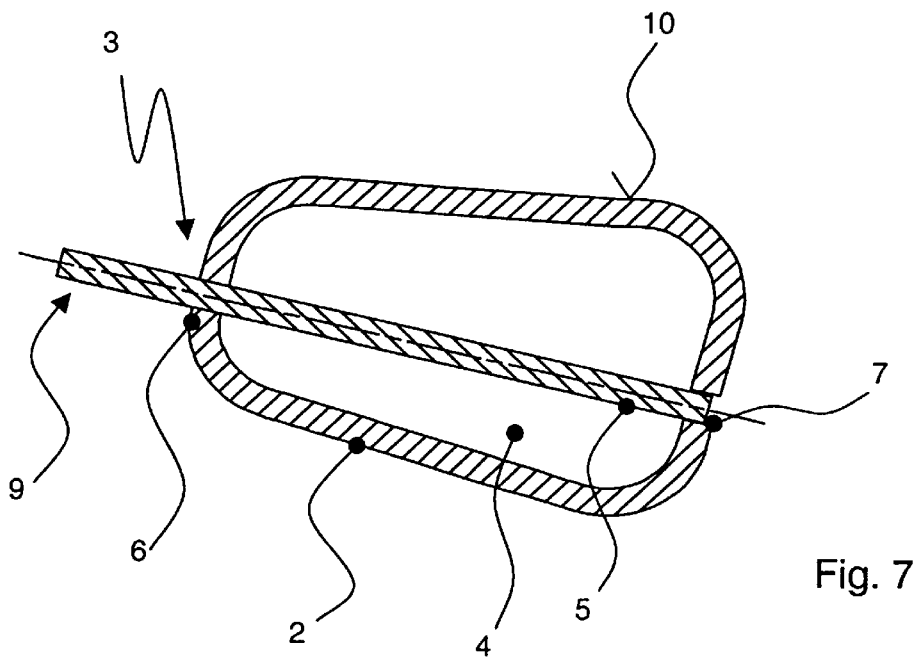
FIG. 7 is a cross-sectional view of the vehicle structural component of FIG. 3, taken along the line VII—VII in FIG. 3.
Figure 8:
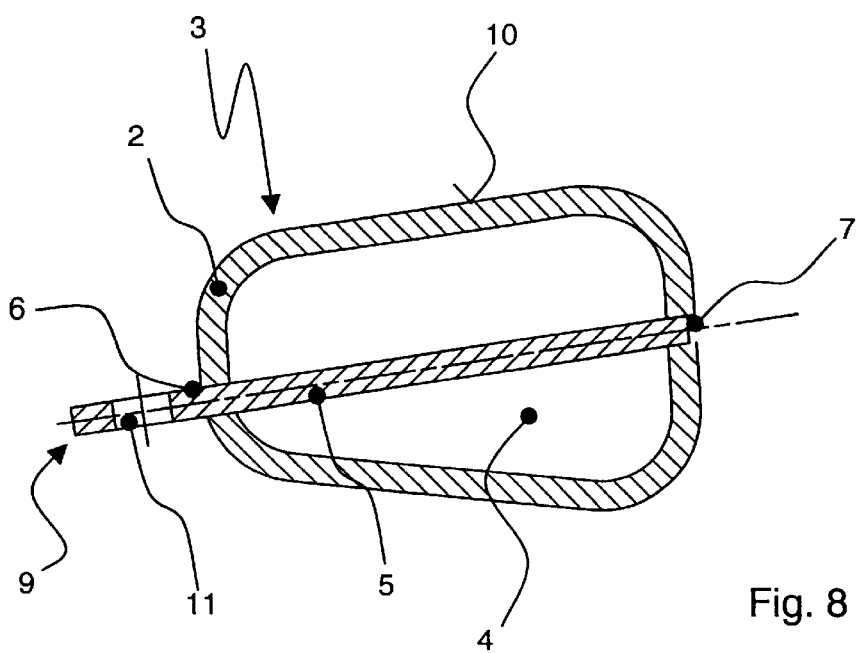
FIG. 8 is a view showing a further cross-sectional view of the vehicle structural component of FIG. 3 taken along the line VIII—VIII, wherein the reinforcing element is provided with a device for positioning and/or connecting the hollow shaped part to the vehicle body.

FIGS. 7 and 8 show a further embodiment of the device 3 in a cross-section taken along the lines VII—VII and VIII—VIII in FIG. 3. The reinforcing element 5 is provided with a device 9 for body connection and for positioning of the reinforcing element 5. The reinforcing element 5 extends with an end in the region of the aperture 6, outwardly beyond an outer side 10 of the hollow shaped part 2 and forms at this end the device 9 for positioning and body connection.

When the hollow shaped part 2 has two apertures 6, 7, it is to be understood by a person skilled in the art that the reinforcing element 5 is formed so that, in deviation from the above described embodiments, it extends in the region of the further aperture 7 outwardly beyond the inner space 4 of the hollow shaped part 2. A further device for positioning and connection of the reinforcing element 5 and thereby the vehicle structural component 2 can be arranged on the vehicle body 1, which can take place in some cases instead of the device 9.

The device 9 for positioning and body connection preferably can be formed as a bracket which remains outside the hollow shaped part or the A-support 2. The bracket 9 is provided with openings 11 and can be used in some cases also for mounting of further components in the vehicle, such as for example hoses, cables and the like.

The hollow shaped part 2 of the above described embodiments is formed as a one-piece component produced by inner high pressure molding. It has a variable cross-section which can locally correspond to the special structural space requirements and the strength requirements of the vehicle body 1.

The reinforcing element 5 can be fixedly connected with the hollow shaped part 2 in the region of the aperture 6 by thermal connecting process. For example, it can be connected by welding or soldering with the hollow shaped part 2. Furthermore, it is believed to be clear for a person skilled in the art that a fixed connection can be also provided for the corresponding applications, between the reinforcing element 5 and the hollow shaped part 2 in the region of the further aperture 7.

On the other hand, the fixed connection between the hollow shaped part 2 and the reinforcing element in the region of the apertures 6 or 7 can be provided by a mechanical connection such as for example by cramping, stamping or squeezing. Alternatively, the fixed connection can be also produced by a combination of a thermal connection process and a mechanical connection.

The reinforcing element 5 is arranged in highly loaded regions of the hollow shaped part 2, for example in the regions in which the hollow shaped part 2 can be subjected to buckling or bending. An increase of the strength of the hollow shaped part 2 can be also provided in other regions where it is required.

It is believed to be understood that also several reinforcing elements can be also provided in the longitudinal direction of the hollow shaped part 2. Therefore the hollow shaped part 2 is provided with a reinforcing element in the highly loaded regions, while the less loaded regions remain free to achieve a further weight reduction. Moreover, for saving the material and thereby for reducing the weight of the vehicle structural component 2, the reinforcing element 5 in a not shown manner can be reducing in a diamond shape at its free ends in the longitudinal direction of the reinforcing element 5, in the inner space 4 of the hollow shaped part 2. The reinforcing element 2 completely extends through the inner space 4 of the hollow shaped part 2 not over its total length.

For providing an especially effective reinforcement of the hollow shaped part 2, the reinforcing element 5 is arranged in the inner space 4 of the hollow spaced part 2, or its orientation in the hollow shaped part 2 is provided so that, in dependence on the selected profile, the maximum resistance moment of the reinforcing element 5 counteracts the maximum stress or load of the hollow shaped part 2.

In the shown embodiments the above described device 3 increases a buckling strength of an A-support, in particular in the region of the buckling or the mirror triangle of a vehicle body. This is achieved in that a simply designed reinforcing element 5 or a central web for reinforcement is introduced in the A-support.

The above described embodiment of a vehicle structural component with a reinforcement element is advantageous over the conventional reinforcements, since with at least the same buckling strength it has a substantially reduced width. Moreover, a reduction of a membrane action is provided which otherwise can cause buckling in of the outer surfaces of the hollow shaped part 2, in particular under the action of a bending load.

The device for increasing the strength of a hollow component with a closed cross-section for a vehicle body can be used naturally for all crash-responsive regions of the closed hollow profiles, as well as for components of a vehicle body which require increased strength, such as for example safety belt connections. Further applications include also those regions of the vehicle body which require stiffness, such as for example cable knots susceptible to torsion, as well as longitudinal supports which are subjected to a bending stress.

Figure 9:
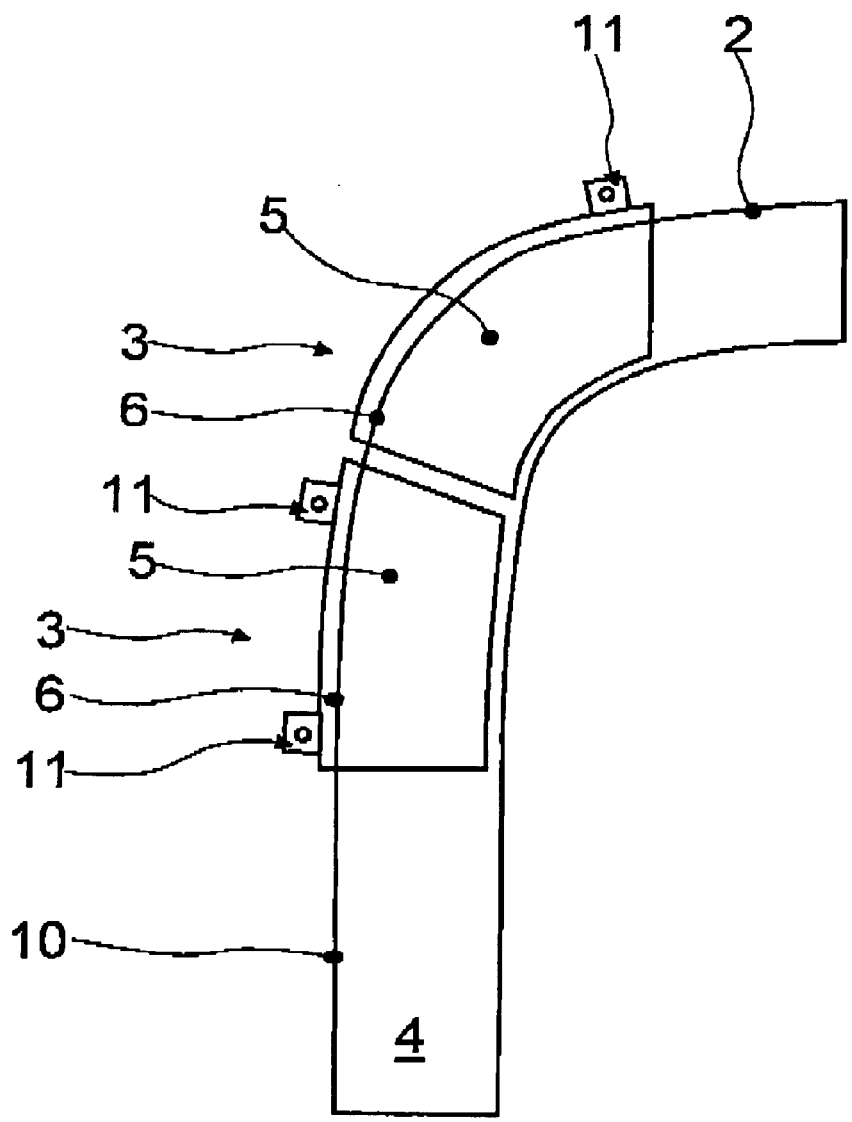
FIG. 9 is a view showing another modification of the structural component with an additional reinforcing element.

The device in accordance with the present invention can have an additional reinforcing element 5, as shown in FIG. 9.

It will be understood that each of the elements described above, or two or more together, may also find a useful application in other types of constructions differing from the types described above.

While the invention has been illustrated and described as embodied in device for increasing strength of a hollow shaped part of a vehicle body, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for increasing strength of a one-piece hollow shaped part with a closed cross-section for a vehicle body, comprising:

at least one reinforcing element extendable at least partially into an inner space of the one-piece hollow shaped part in a longitudinal direction at least in a section over a length of the hollow shaped part, wherein said at least one reinforcing element is connected with the one-piece hollow shaped part, wherein an aperture is provided in the one-piece hollow shaped part, said aperture being formed in a manner that said reinforcing element extends into the inner space of the one-piece hollow shaped part, and a centering contour formed in the one-piece hollow shaped part at least over a portion of a region of an end of said reinforcing element arranged in said inner space, whereby the centering contour is arranged so that in the event of a deformation of the one-piece hollow shaped part, the reinforcing element is received into the centering contour and centered there.

2. A device as defined in claim 1, wherein the hollow shaped part is formed as a molded one-piece component.

3. A device as defined in claim 1, wherein said reinforcing element extends in a longitudinal direction at least in a section over a length of the hollow shaped part.

4. A device as defined in claim 1, wherein said reinforcing element has one end which in a region of said aperture extends outwardly beyond an outer side of the hollow shaped part and is provided at said end with a device selected from the group consisting of a positioning device, a body connection device, and both.

5. A device as defined in claim 1, wherein said reinforcing element has a free end extending into the inner space of the hollow shaped part.

6. A device as defined in claim 1, wherein said reinforcing element has an I-profile and is located at least approximately centrally of the hollow shaped part.

7. A device as defined in claim 6, wherein said reinforcing element has said I-profile in a cross-section.

8. A device as defined in claim 1; and further comprising an additional such reinforcing element, said reinforcing elements being provided in a longitudinal direction of the hollow shaped part.

9. A component of a vehicle body, including a one-piece hollow shaped part having a closed profile with an inner space and an aperture; a reinforcing element arranged at least partially in said inner space of said one-piece hollow shaped part and connected with said one-piece hollow shaped part, said reinforcing element extending into said inner space of said one-piece hollow shaped part through said aperture in a longitudinal direction at least in a section over a length of the hollow shaped part, and a centering contour formed in the one-piece hollow shaped part at least over a portion of a region of an end of said reinforcing element arranged in said inner space, whereby the centering contour is arranged so that in the event of a deformation of the one-piece hollow shaped part, the reinforcing element is received into the centering contour and centered there.

* * * * *